(12) United States Patent
Niklewicz (10) Patent No.: US 10,920,815 B2
(45) Date of Patent: Feb. 16, 2021

(54) HIGH TOLERANCE REMOVABLE BLIND FASTENER

(71) Applicant: Kwikbolt Limited, Kingston upon Thames (GB)

(72) Inventor: Jan Niklewicz, Kingston upon Thames (GB)

(73) Assignee: KWIKBOLT LIMITED, Kinston upon Thames (GB)

( * ) Notice: Subject to any disclaimer, the term of this patent is extended or adjusted under 35 U.S.C. 154(b) by 0 days.

(21) Appl. No.: 15/746,634

(22) PCT Filed: Jul. 21, 2016

(86) PCT No.: PCT/IB2016/054340
§ 371 (c)(1),
(2) Date: Jan. 22, 2018

(87) PCT Pub. No.: WO2017/013612
PCT Pub. Date: Jan. 26, 2017

(65) Prior Publication Data
US 2018/0209462 A1 Jul. 26, 2018

(30) Foreign Application Priority Data
Jul. 22, 2015 (GB) .................................. 1512876

(51) Int. Cl.
*F16B 19/10* (2006.01)
*B25B 31/00* (2006.01)

(52) U.S. Cl.
CPC .......... *F16B 19/109* (2013.01); *B25B 31/005* (2013.01)

(58) Field of Classification Search
CPC ....... F16B 13/06; F16B 19/109; F16B 21/165
(Continued)

(56) References Cited

U.S. PATENT DOCUMENTS 3,000,086 A * 9/1961 Davis ........................ F16B 5/06
  269/48.4
3,117,484 A * 1/1964 Myers ................... F16B 5/0208
  411/348

(Continued)

FOREIGN PATENT DOCUMENTS

WO  2010027439 A2  3/2010
WO  2010027439 A3  6/2010

OTHER PUBLICATIONS

PCT/IB2016/054340 International Search Report, dated Jun. 10, 2016.

*Primary Examiner* — Jacob J Cigna
*Assistant Examiner* — Michael W Hotchkiss
(74) *Attorney, Agent, or Firm* — Schott, P.C.

(57) ABSTRACT

A removable blind fastener includes an anti-rotation body having an external face with an aperture, the external face being suitable for engaging with a surface of a work-piece to be clamped. The fastener further includes a hollow leg member with a plurality of slots defining outwardly biasable resilient legs at one end and an externally threaded portion at the other end, the leg member having a bore tapering towards the legs, the leg member being translatable through the aperture, the leg member and the aperture further having inter-engaging anti-rotation features to prevent the leg member from rotating about its central axis relative to the anti-rotation body. The fastener may further include a thread tube with an internal thread cooperable with the external thread of the leg member and located co-axially with the leg member and a rod member having a shaft with a head end and a free end.

19 Claims, 7 Drawing Sheets (58) Field of Classification Search
USPC .................................................... 269/48.1
See application file for complete search history.

(56) References Cited

U.S. PATENT DOCUMENTS

| | | | | |
|---|---|---|---|---|
| 3,424,050 A * | 1/1969 | Burrow | ............... | F16B 4/002 269/48.4 |
| 3,883,129 A * | 5/1975 | Jones | ............... | F16B 19/109 269/49 |
| 4,548,533 A * | 10/1985 | Pratt | ............... | F16B 19/109 24/607 |
| 4,557,033 A * | 12/1985 | Champoux | ............... | B23P 9/025 29/525 |
| 4,934,885 A * | 6/1990 | Woods | ............... | F16B 5/0233 24/453 |
| 4,936,726 A * | 6/1990 | Medard | ............... | B21J 15/04 411/44 |
| 5,042,787 A * | 8/1991 | Duffaud | ............... | B21J 15/42 269/48.4 |
| 5,048,805 A * | 9/1991 | Wiseman | ............... | B21J 15/42 269/48.4 |
| 5,240,361 A * | 8/1993 | Armstrong | ............... | F16B 19/109 269/48.2 |
| 5,433,100 A * | 7/1995 | Easterbrook | ............... | B23P 9/025 29/446 |
| 6,056,283 A * | 5/2000 | Gage | ............... | B25B 31/005 269/48.4 |
| 6,196,779 B1 * | 3/2001 | Falk | ............... | B25B 31/005 408/79 |
| 7,048,266 B2 * | 5/2006 | Starr | ............... | B21J 15/42 254/18 |
| 7,070,375 B2 * | 7/2006 | Hoeckelman | ............... | F16B 19/109 269/48.1 |
| 7,300,042 B2 * | 11/2007 | McClure | ............... | B25B 31/005 269/309 |
| 7,437,904 B2 * | 10/2008 | Katzenberger | ............... | B23P 9/025 29/523 |
| 8,448,929 B2 * | 5/2013 | Prot | ............... | B23B 49/026 269/49 |
| 8,869,372 B2 * | 10/2014 | Luneau | ............... | B21J 15/043 269/95 |
| 9,404,848 B2 * | 8/2016 | Kesterson | ............... | G01N 19/04 |
| 10,124,449 B2 * | 11/2018 | Branyon | ............... | B23P 11/00 |
| 10,190,615 B2 * | 1/2019 | McClure | ............... | F16B 19/109 |
| 10,221,879 B2 * | 3/2019 | Mugan | ............... | F16B 21/086 |
| 10,260,548 B2 * | 4/2019 | McClure | ............... | F16B 13/06 |
| 2005/0200066 A1 * | 9/2005 | McClure | ............... | B25B 31/005 269/47 |
| 2013/0039716 A1 * | 2/2013 | McClure | ............... | F16B 13/06 411/80.1 |
| 2019/0128307 A1 * | 5/2019 | McClure | ............... | F16B 19/109 |

* cited by examiner

Fig. 11 ature of the Invention

HIGH TOLERANCE REMOVABLE BLIND FASTENER

BACKGROUND

Field of the Invention

The present invention is concerned with improvements in or relating to removable blind fasteners and is particularly concerned with removable blind fasteners for use in temporarily co-joining wing elements of an aircraft frame.

In the manufacture of aircraft frames, especially the wing elements, removable blind fasteners are used as a temporary fixing for the wing elements by inserting the fasteners in apertures provided in the wing elements. This is performed to determine the compatibility of the co-joined elements during an inspection process with adjustment of the apertures and alignment of the wing elements as necessary. After inspection and adjustment as required the removable blind fasteners are removed and permanent blind fasteners installed in the apertures.

Aircraft structures, such as wing sections and fuselages, are assembled by fixing sheet materials to rigid members such as spars, ribs, runners, stringers etc. In order to fix, for example, a wing-skin panel to a number of ribs, the wing-skin panel is placed over the ribs, aligned and clamped securely in place. A series of holes are drilled through the materials, and permanent fastenings such as rivets are placed and secured. For small structures clamping of the component materials can be along the edge of the materials.

For large structures however it is not possible to achieve accurate alignment with this technique. For the assembly of large structures a series of clamping holes are drilled at selected points across the structure. Temporary fasteners are then inserted into these holes to secure the component materials while further holes are drilled to receive permanent rivet fasteners. When rivets have been placed and secured the temporary fasteners are removed and subsequently replaced with permanent rivet fastening. The number and location of the temporary fastenings will vary between applications, but for a typical wing set, i.e. two complete wings, for a large commercial passenger aircraft, the number of temporary fastenings used can reach around 25,000.

It is convenient for such temporary fasteners to be operated from one side of the work-piece only, i.e. to insert and activate the fastener from above the work-piece without having to perform an operation on the underside of the work-piece, for instance screwing or tightening. Not only does one-sided operation simplify the assembly process, but it is often the case that the underside of a work-piece is not accessible at all. Fasteners that are operable from a single side of the work-piece are termed "blind" fasteners.

Description of Related Art

Figure 11:
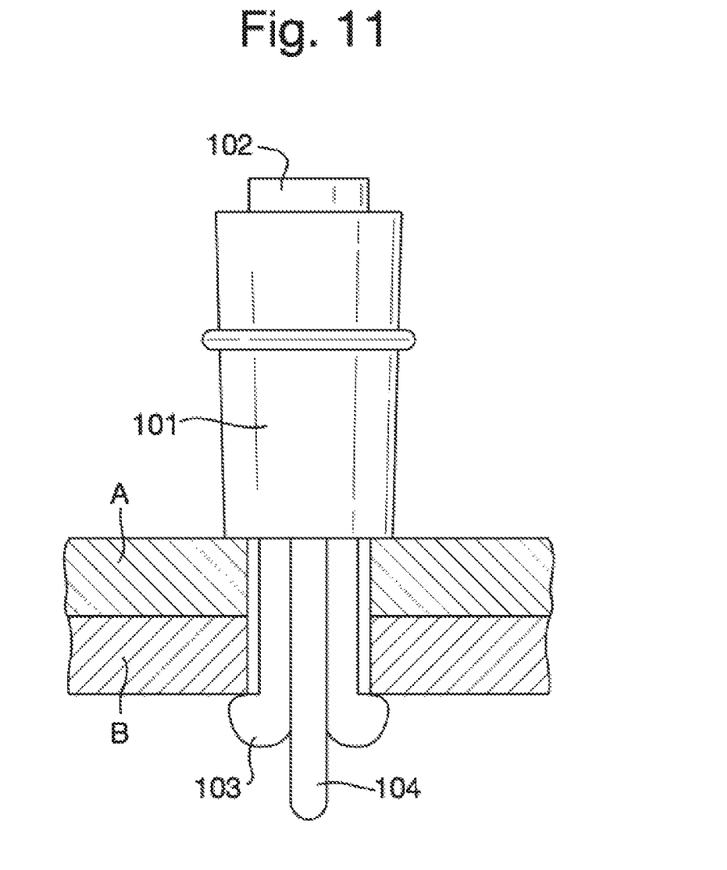
FIG. 11 is a prior art fastener.

Conventionally, spring-loaded temporary fasteners are used, of the type shown in FIG. 11. The fastener has a body 101, a cap 102 and jaws 103. The jaws 103 of the fastener are biased towards, and rest against, a locating strip 104. The jaws 103 are extended by depressing the cap 102 against the action of an internal spring (not shown). Extension of the jaws 103 causes them to travel along the locating strip 104. As the jaws 103 reach the end of the strip and their width becomes narrowed. The jaws 103 may then pass through a hole between work-pieces A and B. As the pressure on the cap 102 is removed the jaws 103 retract and expand as they travel back along the locating strip 104 towards the body 101. As they expand the jaws grip the outer surface of work-piece B and pull it towards work-piece A.

US2004/0208721 (Kuenzel) describes a removable blind fastener for insertion into an aperture to fix a component to a structural member. The fastener has a central screw member cooperating with a threaded gripping member, so that when the screw member is turned the gripping member is expanded so that it cannot be withdrawn from the aperture and is also drawn towards the component to eventually clamp the component to the structural member. The structure described above of a male-threaded screw member actuating the jaws of a gripping member is a common arrangement for fasteners. However, the tolerance (i.e. accuracy) of the outside diameter of the fastener is limited by the accuracy to which the thread on the screw member can be fabricated; typically this tolerance is and may even change over time as the threads are worn away through repeated actuation of the gripping member. A further disadvantage of this arrangement is that the clamping load is limited by the diameter of the thread on the screw; therefore a fastener for a narrow aperture may have an unacceptably low clamping load because of the narrow thread. It is therefore an object of the present invention to overcome these limitations.

SUMMARY OF THE INVENTION

In an embodiment of the invention, a removable blind fastener is provided, comprising; an anti-rotation body having an external face with an aperture, wherein the external face is suitable for engaging with a surface of a work-piece to be clamped, the fastener further comprising a hollow leg member having a plurality of slots defining outwardly biasable resilient legs at one end and an externally threaded portion at the other end, the leg member having a bore tapering towards the legs, the leg member being translatable through the aperture in the anti-rotation body, the leg member and the aperture further having inter-engaging anti-rotation features to prevent the leg member from rotating about its central axis relative to the anti-rotation body, the fastener further comprising a threaded tube with an internal thread co-operable with the external thread of the leg member and located co-axially with the leg member, the fastener further comprising a rod member having a shaft with a head end and a free end, the shaft being a close fit with the bore of the leg member at the threaded end of the leg member, wherein the head end of the shaft is fixed to the threaded tube at one end of the threaded tube with the rest of the shaft passing through the threaded tube and the free end of the shaft extending into the bore of the leg member, such that rotation of the rod member can cause the leg member to be drawn into the threaded tube and the free end of the rod member to engage with the tapered bore of the leg member and cause the legs to bias radially outwards. The legs are forced outward by the free end of the rod and they are kept biased outwards by the rod as the legs translate along the rod to the clamping position. The legs dowel the two components being clamped. The legs are not urged outwards by a threaded portion, which means that the tolerance of the doweling part can be carefully controlled.

The threaded tube and threaded portion of the legs are located at the opposite side of the external face of the anti-rotation body to the legs, so that, in operation, all of the threaded regions of the fastener are above the surface of the components being clamped. The thread diameter and hence maximum clamping load can therefore be varied independently of the diameter of the leg member; therefore components having small apertures can be clamped with higher clamping loads. For previously known fasteners at least some part of the threaded component is within the leg structure, so that the diameter of the thread (and hence clamping load) is limited by the diameter of the leg structure; therefore when clamping components with small apertures, only small diameter legs can be used which means a lower maximum clamping load is available.

The external thread portion of the leg member can be a larger diameter than the aperture so that the periphery of the aperture stops the leg member from being removable through the aperture. Other features that achieve the same function of stopping the leg member from being removable through the aperture may be provided.

The anti-rotation features may be grooves and protrusions; grooves on the external surface of the leg member running parallel to the main axis of the leg member and protrusions within the aperture of the anti-rotation body to engage with the grooves on the leg member.

The anti-rotation body may be a tubular housing having an open end and a closed end, wherein the aperture is located in the closed end. The tubular housing may have flat faces for accepting an anti-rotation tool. The threaded tube may be housed within the tubular housing. Bearings may be provided between the threaded tube and the interior of the tubular housing. The open end may have capturing means for holding the threaded tube captive; the capturing means may be removable, such as a circlip.

The legs may have protrusions on the external surface and may include a clamping face parallel to surface of the components to be clamped when the legs are biased outwards.

The rod and threaded tube may be fabricated as a single unit. There may be three slots defining three legs. The threaded tube may have a cavity for receiving the thread of the leg member so that the rod can rotate without the leg member moving. The head of the rod may have a tool engagement feature for rotating the rod. The external face of the anti-rotation body may be angled so that it is suitable for fitting into a counter-sunk hole in the surface of a component being clamped.

In an embodiment a method of temporarily co-joining first and second components using a removable blind fastener as described above is provided, wherein the components have apertures, the method comprising the steps of:

a) aligning the apertures of the first and second component;

b) inserting a fastener through the aligned apertures;

engaging a rotating tool with the head of the rod and a holding tool with the anti-rotation body;

d) operating the rotating tool to rotate the rod to cause telescoping movement of the leg member within the thread tube to bring the free end of the rod into engagement with the tapered bore of the leg member to cause the legs to splay outwards.

BRIEF DESCRIPTION OF THE DRAWINGS

FIG. 5b is a detailed cut-away view of the leg member shown in FIG. 5a.

DETAILED DESCRIPTION OF THE PREFERRED EMBODIMENT

Figure 1:
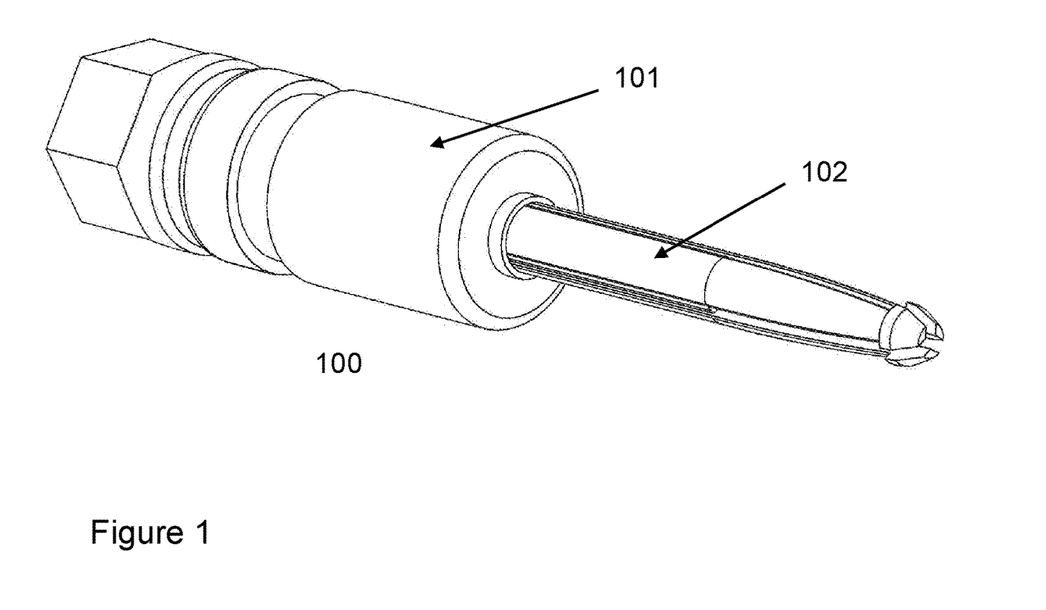
FIG. 1 is a projection view of a fastener in accordance with an embodiment of the invention.

The present invention is a fastener 100 as shown in FIG. 1 for temporarily clamping two or more components together. A specific application for the fastener is for clamping parts of an airframe together while permanent fixings are installed; the fastener 100 can be removed and a permanent fixing installed in its place to complete the airframe. Many removable fasteners 100 may be used to temporarily clamp components of the airframe while permanent fixings are installed. The fastener 100 has a wide main body that remains proud of the surface of the parts, and a leg member for inserting into pre-drilled holes in the parts to be clamped. The fastener 100 is actuated by rotation of a part, causing the leg member to pull the parts together, as described in more detail below.

Figure 2:
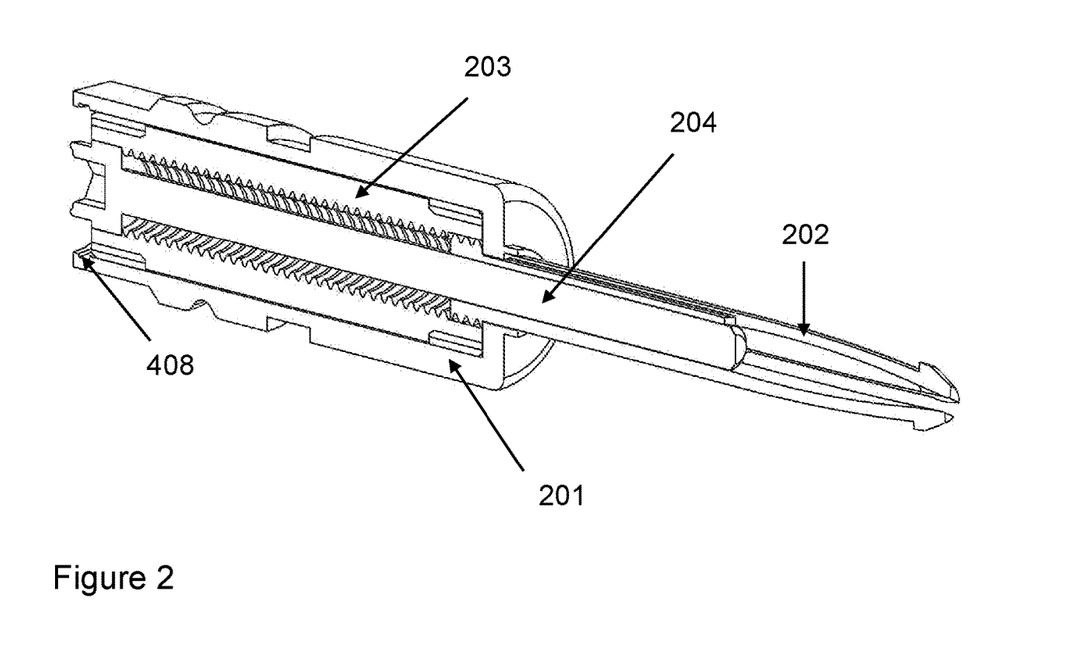
FIG. 2 is cut-away view of the fastener shown in FIG. 1.

The fastener 100 has the following main components as shown in FIG. 2; a main body 201, a leg member 202, thread tube (also referred to as a threaded tube) 203 and rod 204.

Figure 4A:
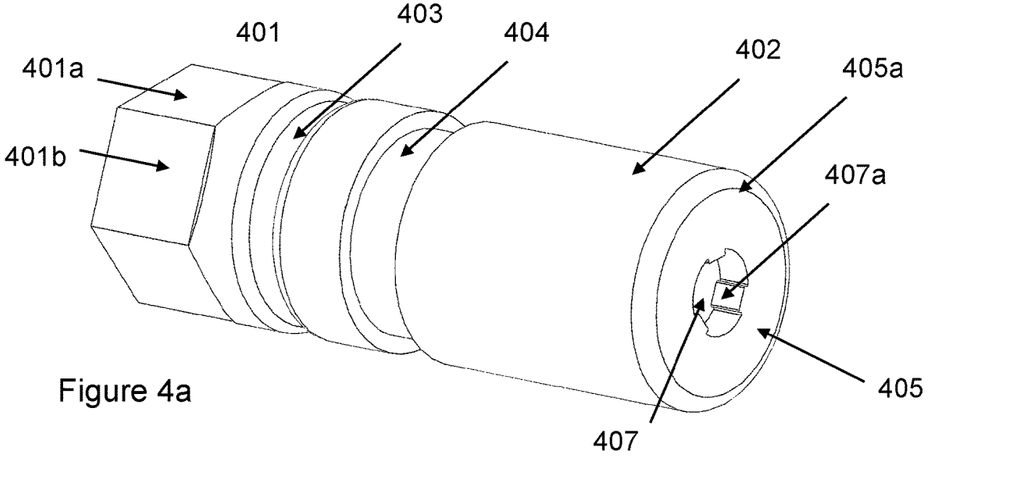
FIG. 4a is a projection view of the main body of the fastener shown in FIG. 1.
Figure 4B:
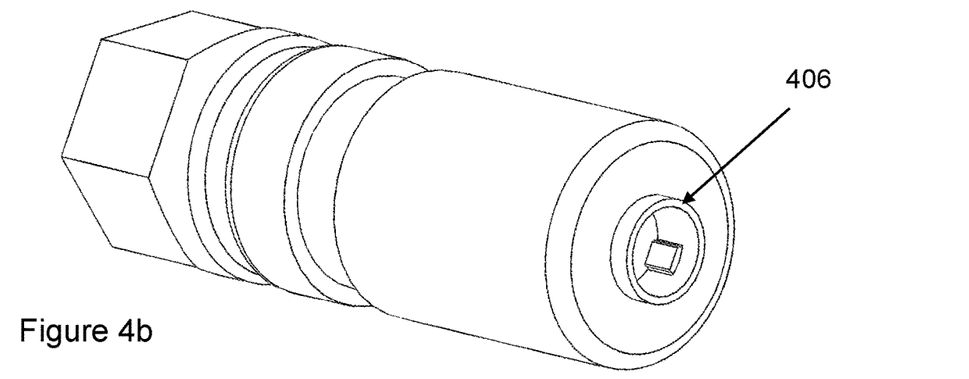
FIG. 4b is a projection view of the main body of a fastener having a counter bore feature.
Figure 4C:
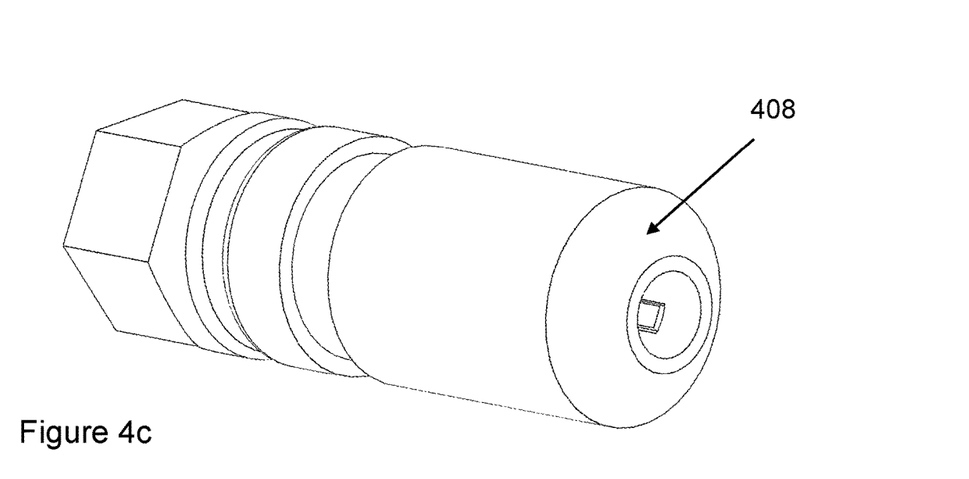
FIG. 4c is a projection view of the main body of a fastener having a counter-sunk feature.

The main body 201, shown in detail in FIG. 4, is a hollow tubular housing 402 open at one end and closed at the other. It has a number of external features; a tool engagement end 401 which is open and has a plurality of external flat faces 401a defining a hexagonal shape. A separate anti-rotation tool can be engaged with the flat faces 401a to prevent the main body 201 rotating when the fastener 100 is actuated. The main body 201 also has a retaining feature 403 comprising a recess around the housing 402 for engagement with fastener handling apparatus for automating the installation and removal of the fastener 100. A square ring recess 404 is also provided for receiving a coloured ring for colour coding the fastener 100. The main body 201 has a flat working face 405 at the closed end perpendicular to the central axis of the tubular housing 402. In use the working face 405 engages with the outer surface of the parts to be clamped. The transition 405a between the working face 405 and the tubular housing 402 is chamfered to reduce damage to the surface of the parts to be clamped. The working face 405 includes an aperture 407. The aperture may include an extended collar 406 as shown in FIG. 4b, or the working face 408 may be angled to fit in a counter-sunk recess in the work pieces as shown in FIG. 4c. The aperture 407 has anti-rotation protrusions 407a shown in FIG. 4a.

Figure 5A:
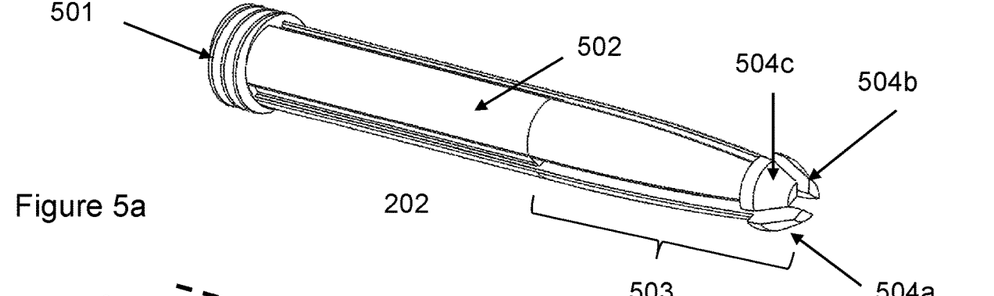
FIG. 5a is a projection view of the leg member of the fastener shown in FIG. 1.
Figure 5B:
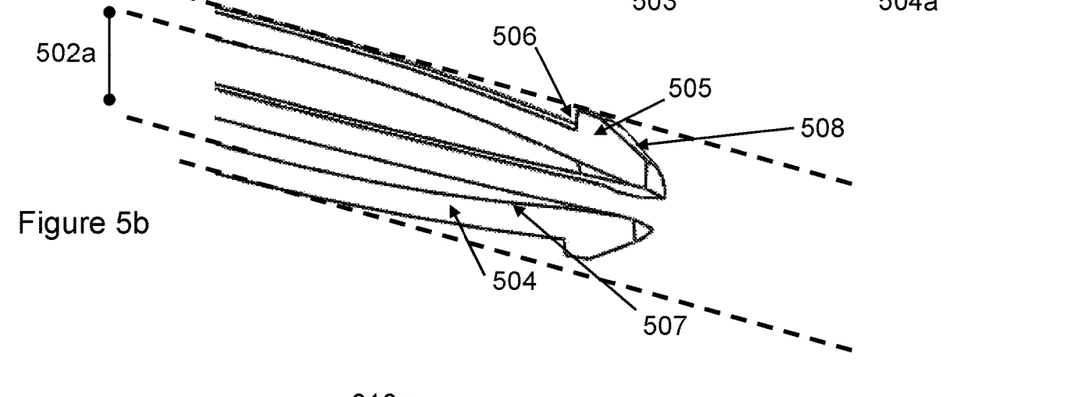

The leg member 202, shown in detail in FIG. 5a, is generally tubular and consists of a threaded portion 501 at one end having an external male thread, a grooved shaft 502 and a leg region 503. The grooved shaft 502 has an internal bore 502a of a constant diameter, which tapers becoming narrower in the leg section 503, as shown in FIG. 5b. The leg region includes three resilient legs 504a, 504b, 504c that can be biased radially outwards away from the central axis. The legs are sprung so that when the legs are deformed radially outward they can spring back to their original position. This allows the fastener to be removable and re-usable. The external surface of the leg region 503 provides a dowelling region for closely fitting into a hole in the components. Each leg 504 has a clamping head 505 at its far end, as shown in FIG. 5b. Each clamping head 505 has a clamping face 506 orientated such that it can engage with a surface of the parts to be clamped and provide a counter-acting clamping force to that provided by the working face 405 of the main body 201. For larger apertures extra legs, for example 4, 5, 6 or more can be provided to spread the clamping load. The legs have a curved cross section, which increases their strength. Each leg also has an internal actuating face 507. The bore of the leg member tapers, becoming narrower at the leg section 503. The actuating face 507 of each leg is the tapering of the bore. The legs 504 are operable between a closed position and an open position; the resting state of the legs 504 is the closed position, where the outside diameter of the clamping heads is less than or equal to the outside diameter of the grooved shaft, so that the heads can be inserted into a hole in the parts to be clamped. In the open position, the legs are biased radially outward, so that the outside diameter of the leg heads is greater than the outside diameter of the grooved shaft and the clamping faces 506 of the clamping heads 505 is parallel to and engageable with a surface of one of the parts to be clamped. The heads 505 also have a chamfered face 508 to allow ease of insertion of the fastener into a hole.

Figure 6:
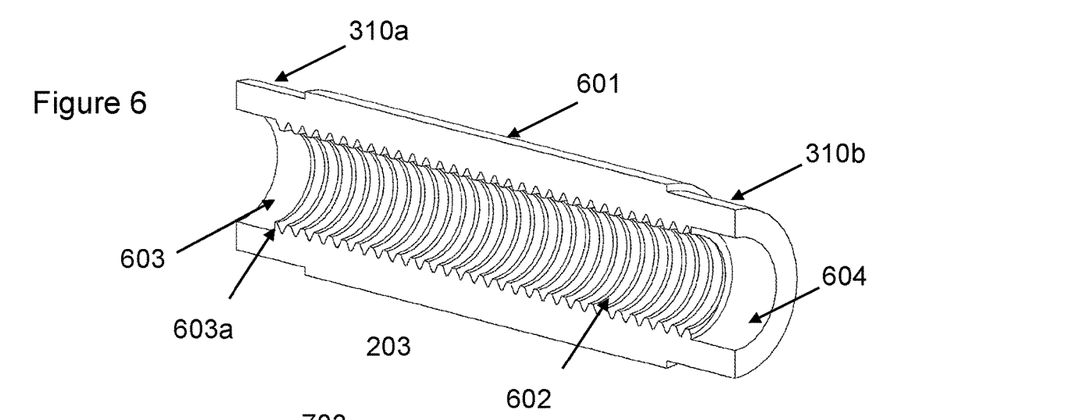
FIG. 6 is a cut-away view of the threaded tube (also referred to as the thread tube) of the fastener shown in FIG. 1.

The thread tube 203 is shown in more detail in FIG. 6. The length and width of the thread tube 203 is such that it fits inside the main body 201. The thread tube 203 has bearing surfaces 310a and 310b of reduced diameter at each end to accommodate bearings. The interior of the thread tube 203 has an internal female thread 602 along most of its length, co-operable with the male thread on the end of the clamping member 202. Two regions of the interior of the thread tube 203 are thread-less; the rod engagement area 603 and the free-turning area 604. Both the rod engagement area 603 and free-turning area 604 have parallel cylindrical sides. The rod-engagement area 603 is defined by two features at each end: at one end a shoulder 603a is provided at the transition between the rod engagement area 603 and the thread 602; at the other end by a circlip slot (reference 408 in FIG. 2) running around the internal circumference of the thread tube 203 near the opening.

Figure 7:
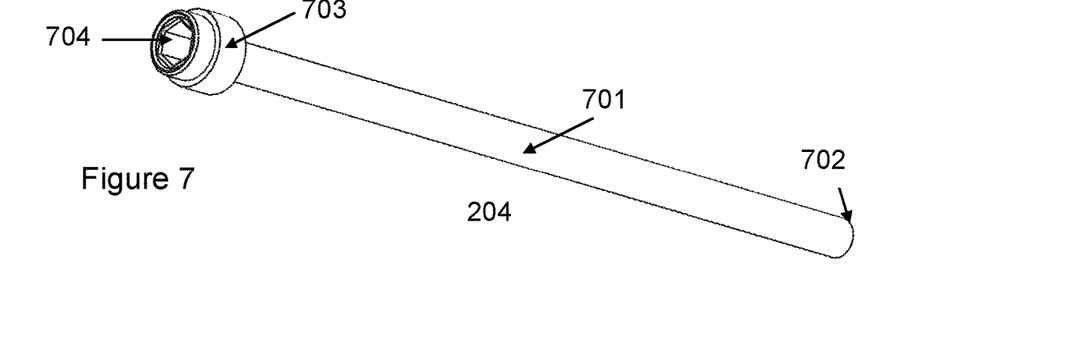
FIG. 7 is a projection view of the rod of the fastener shown in FIG. 1.

The rod 204 has a long main shaft 701 and a head 703, as shown in FIG. 7. The main shaft 701 is a solid cylindrical body with a diameter allowing it to fit closely inside the hollow shaft 502 of the leg member 202. The main shaft 701 has a chamfered end 702. The head 703 of the rod 204 is of greater diameter than the main shaft 701. The head 703 is itself cylindrical, having sides 703 parallel to the main shaft 701 and is of substantially the same length as the rod engagement area 603 of the thread tube 203. The head 703 also has a hex slot 704 for engaging with a tool to rotate the rod 204.

Figure 3:
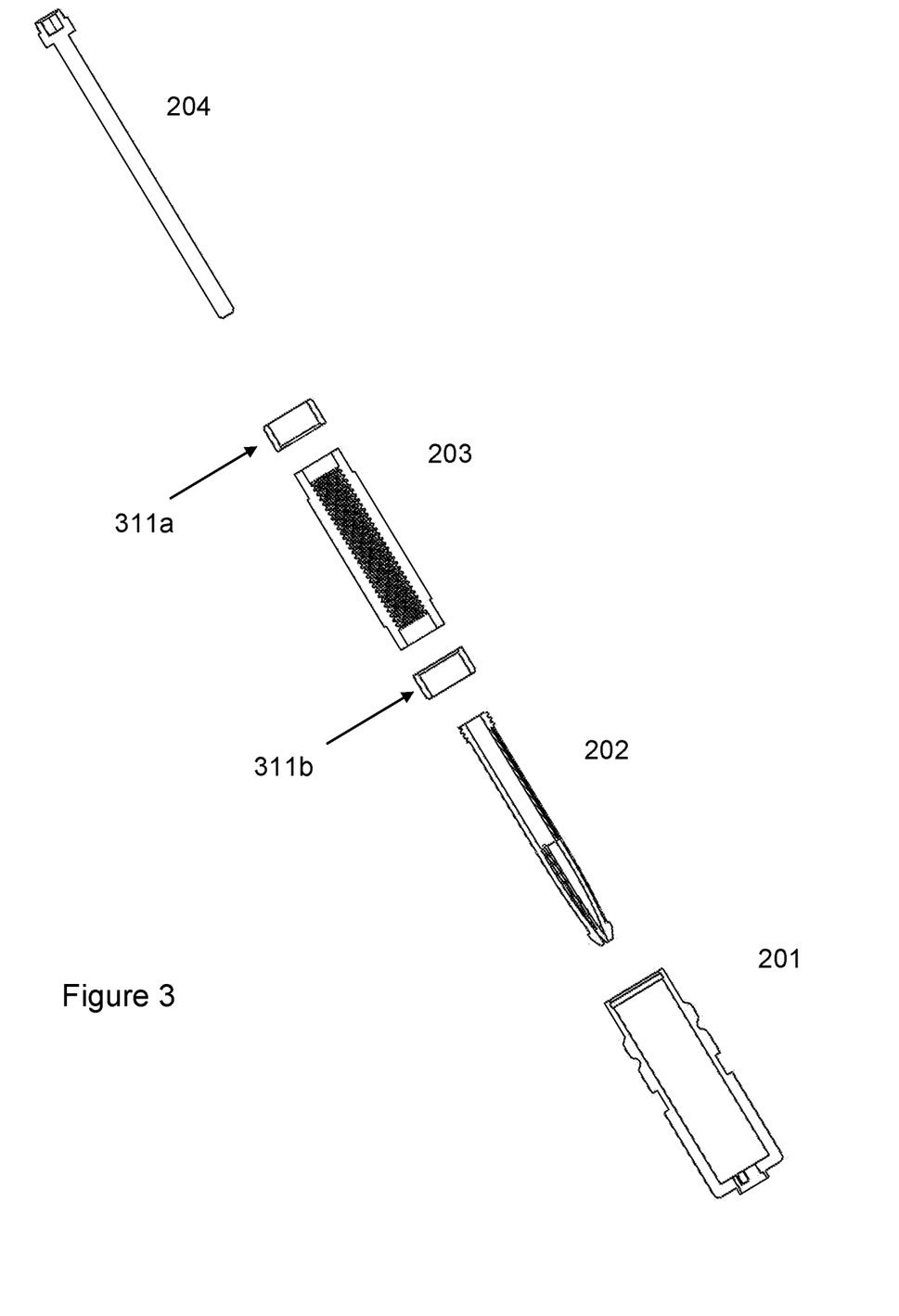
FIG. 3 is an exploded view showing the components of the fastener of FIG. 1.

The components of the fastener 100 fit together as follows, with reference to FIG. 3:

The rod 204 reaches through the thread tube 203 until the head 703 abuts the shoulder 603a in the thread tube 203. A length of the rod 204 then protrudes from the end of the thread tube 203 and a tubular cavity is then defined between the internal threaded surface of the thread tube 203 and the external surface of the rod. The head 703 of the rod 204 is a snug fit into the rod engagement area 603 and the two components are rigidly joined together; either by brazing, gluing, shrink-fitting or any other fixing technique, such that when the rod 203 is rotated, the thread tube 202 also rotates. Alternatively the rod 203 and thread tube 202 can be fabricated as a single unit. Bearings 311a, 311b are fitted to the bearing surfaces 310a, 310b of the thread tube 203. The bearings are rings with an inside diameter which allows them to fit closely over the bearing surfaces of the thread tube and still be rotatable. The bearings are a thickness such that they stand slightly proud of the surface of the thread tube when they are in place. The bearings may be made of a self-lubricating material such as bronze, PTFE or graphite or they may be lubricated externally with oil or may not be lubricated.

The leg member 202 is inserted into the main body 201 and through the aperture 407. The grooves in the grooved shaft 502 engage with the anti-rotation protrusions 407a, and cooperation between these two features allow the leg member 202 to translate along the central axis in a telescopic movement but prevents the leg member 202 from rotating around the central axis. The threaded portion 501 of the leg member 202 provides a stop to prevent the leg member from being pushed all the way through and out of the aperture 407 in the main body 201.

The rod 204, thread tube 203 and bearing 311 assembly is then slid into the main body/leg member assembly, so that the chamfered end of the rod 204 fits into the bore 502a of the grooved shaft region of the leg member. The diameter of the rod 204 and the internal diameter of the bore 502a of the grooved shaft region of the leg member are fabricated so that they are a close fit. The rod, thread tube and bearing assembly is stopped when the end of the thread tube 203 contacts the closed end of the main body 201. The thread tube assembly can be retained in the main body by installing a circlip in the circlip slot 408.

Figure 10:
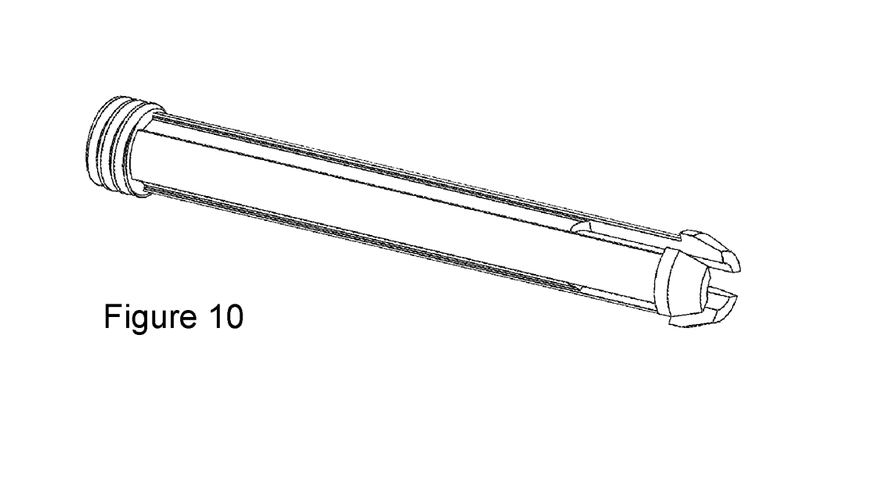
FIG. 10 is projection view of the leg member of FIG. 5a, showing the legs extended radially outwards.

The rod, thread tube, leg member and main body may be made from any suitable metal such a steel or, alternatively these parts may be made from carbon fibre reinforced plastic compositions. Alternatively, the parts of the fastener may be fabricated from different materials, for example the leg member and main body made from plastic components while the rod and thread tube made from steel. The leg member may be machined or 3D printed. If 3D printed metal component is fabricated, it is printed with the legs in the radially extended state, as shown in FIG. 10 and subsequently heat treated to bring the legs together so that in its resting state the internal bore in the leg region is narrower than bore in the thread region. The leg member is highly polished so that it does not damage the components being clamped. The rod is typically made of hardened steel.

Figure 8A:
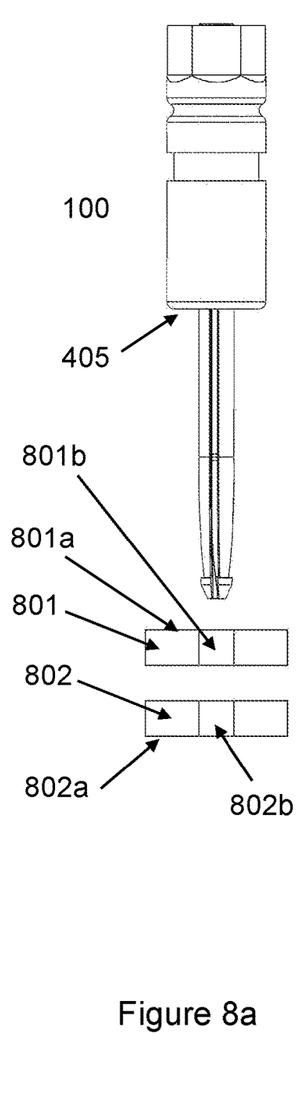
FIGS. 8a to 8d are a sequence showing the operation of the fastener of FIG. 1 clamping two components together.
Figure 8B:
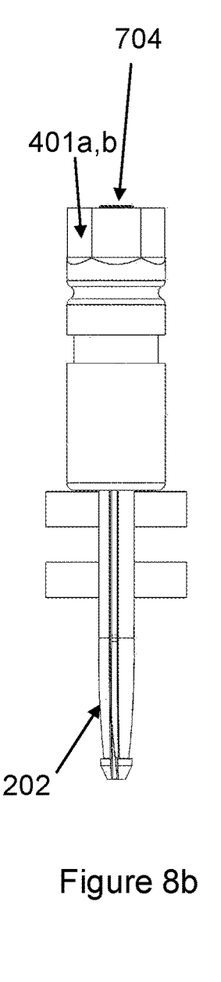
Figure 8C:
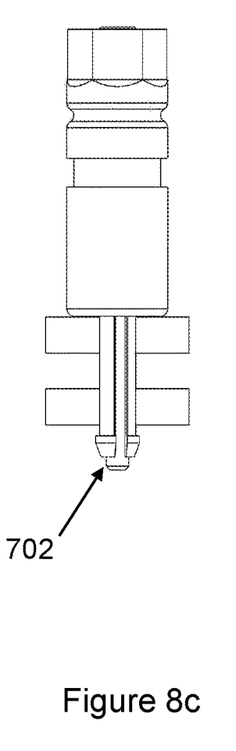
Figure 8D:
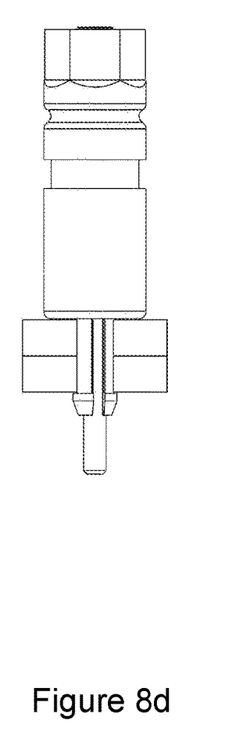

Operation of the fastener 100 is described below with reference to FIGS. 8a to 8d. Two components to be joined 801 and 802 are shown in FIG. 8a, 801 having an upper surface 801a and a pre-drilled hole 801b and 802 having a lower surface 802a and a pre-drilled hole 802b. Components 801, 802 may extend in a lateral direction beyond that shown. The pre-drilled holes are aligned and the leg member 202 of the fastener 100 inserted through the aligned holes, as shown in FIG. 8b until the working face 405 of the main body 201 contacts the upper surface of 801a of component 801. The diameter of the leg member 202 can be selected to fit the hole or the hole can be drilled to fit the available diameter of the leg member. A series of fasteners can be provided with leg members of varying diameters to suit many applications. It is preferable that the leg member is a close fit into the holes of the components being clamped to ensure accurate alignment of the components. The fastener 100 may be inserted by hand into the holes of the components or may be handled by a machine. The tool engagement faces 401a,b of the main body 201 are gripped by a tool to stop the fastener rotating and a further tool is engaged with the hex slot 704 of the rod 204 to cause it to rotate. Rotation of the rod 204 causes the thread tube 203 to rotate; the internal thread 602 of the thread tube 203 engages with the external thread on the thread section 501 of the leg member 202 and given that the leg member cannot rotate with the thread tube because of the anti-rotation protrusions 407a in the aperture of the main body 201, the threaded section of the leg member moves along the threads of the thread tube and the leg member is drawn into the main body 201. The rod 204 rotates but the position of its chamfered end 702 remains static; therefore, as the leg member 202 moves towards the main body, the head end of the leg member 202 moves towards the end of the rod 702. Continued rotation of the rod 204 will bring the activation faces 507 in the leg region 503 of the leg member 202 into contact with the chamfered end of the rod 702 because the bore of the leg member in this region is narrower than the diameter of the rod. The movement of the leg member past the chamfered end of the rod will force the legs 504a, b, c radially outward to the point where the chamfered end of the rod 702 protrudes beyond the end of the legs 504, as shown in FIG. 8c. At this stage the legs are fully expanded and the clamping faces 506 of the legs are parallel to the underside 802a of the second component 802. Preferably there is no contact with the component during this leg expansion phase, so that the outward movement of the legs does not damage the components to be clamped. Further continued rotation of the rod 204 causes the leg member to be drawn further into the main body 201, until the clamping faces 506 engage with the underside of the component, causing the components to be drawn together. A selected torque can be applied to the rod 204 to apply the required clamping load between the working face 405 of the main body 201 and the clamping faces 506 of the clamping member 202, as shown in FIG. 8d. The leg region 503 of the leg member 202 serves as a dowel and the length of this part can be fabricated to suit the total thickness of the components to be clamped. The length of the grooved shaft 502 of the leg member can be fabricated to suit the required grip range.

To release the fastener 100 the rod is rotated in the reverse direction so that the leg member 202 is pushed out of the main body 201 and back along the rod 204. As the leg region 503 moves back past the chamfered end 702 of the rod, the resilient legs will move radially inwards back to their resting position so that the clamping heads are able to fit through the aligned holes in the clamped components. Alternatively the rod can be further rotated until the thread section 501 of the leg member 202 disengages entirely from the internal threads 602 of the thread tube 203 and sits inactively within the free-turning area 604 of the thread tube; further rotation of the rod will have no effect.

Many types of fastener use a threaded screw to act against legs to expand them prior to clamping; the legs are used to clamp and dowel components together. However, this has the disadvantage that the tolerance of the dowel is determined by the tolerance of the screw dimensions. This is not desirable because a) it is difficult to control the accuracy of thread dimensions during fabrication and b) the threads can wear down or bite into the legs during repeated use. By contrast, the legs 504 of an embodiment of the present invention are acted on and expanded by the smooth shaft of the rod 204. This allows the tolerance of the dowel to be much more closely controlled because a) the interface between the rod and the internal bore of the leg member can be fabricated to a high tolerance because they are both smooth (i.e. not threaded) surfaces and b) continued movement of these two parts against each other will not substantially change their dimensions. Tolerances of greater than 0.01 mm are possible.

A further advantage of the embodiment of the invention described above is that the maximum clamping load can be increased almost without limit. The maximum clamping load is determined by the diameter of the thread used to impart a clamping force to the legs. Therefore conventional fasteners having legs with an internal thread are inherently limited; the thread diameter cannot be increased without increasing the outside diameter of the legs but this diameter is determined by the diameter of the hole available within the components being clamped; if the hole is small then the clamping load will be low. By contrast, the present fastener 100 has an external thread 501 on the end of the leg member, located in the main body 201. To increase the clamping load means increasing the diameter of the main body to accommodate an increased thread size, which is therefore not limited by the size of the hole in the components. It is therefore possible to have a high clamping load when joining components through a small hole. Typical dimensions of aperture in which the fastener 100 can be used range from 4 mm to 9 mm, although other dimensions are of course possible, for example 10 mm to 20 mm apertures.

Figure 9:
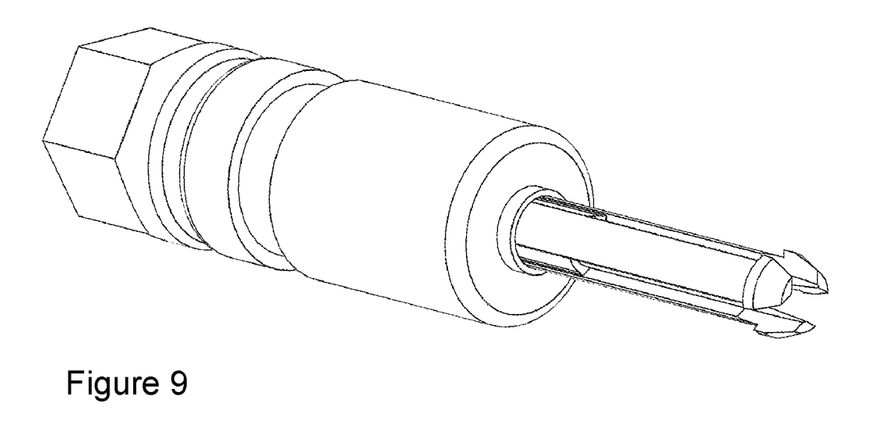
FIG. 9 is a projection view of a fastener in accordance with a further embodiment of the invention.

It is possible to fabricate a range of fasteners with a variety of grip ranges by extending or reducing the length of the shaft region 502 of the leg member 202. A fastener with a shortened grip range is shown in FIG. 9. Grip ranges can vary between 4 cm and 30 cm but of course there is no real upper or lower limit to this dimension.

The invention claimed is:

1. A removable blind fastener comprising;
   an anti-rotation body having an external face with an aperture, wherein the external face is suitable for engaging with a surface of a work-piece to be clamped,
   a hollow leg member having a plurality of slots defining outwardly biasable resilient legs at one end and an externally threaded portion at the other end, the leg member having a bore tapering towards the legs, the leg member being translatable through the aperture in the anti-rotation body, the leg member and the aperture further having inter-engaging anti-rotation features to prevent the leg member from rotating about its central axis relative to the anti-rotation body,
   a threaded tube with an internal thread co-operable with the external thread of the leg member and located co-axially with the leg member,
   a rod member having a shaft with a head end and a free end, the shaft being a fit with the bore of the leg member at the threaded end of the leg member, wherein the head end of the shaft is permanently joined to the threaded tube at one end of the threaded tube so as to prevent rotation, with the rest of the shaft passing through the threaded tube and the free end of the shaft extending into the bore of the leg member, such that rotation of the rod member can cause the leg member to be drawn into the threaded tube and the free end of the rod member to engage with the tapered bore of the leg member and cause the legs to bias radially outwards.

2. A fastener in accordance with claim 1, wherein the anti-rotation features are grooves on the external surface of the leg member running parallel to the main axis of the leg member and protrusions within the aperture of the anti-rotation body to engage with the grooves on the leg member.

3. A fastener in accordance with claim 1, wherein the threaded tube is housed within the tubular housing.

4. A fastener in accordance with claim 1, wherein the rod and threaded tube are a single unit.

5. A fastener in accordance with claim 1, wherein there are three slots defining three legs.

6. A fastener in accordance with claim 1, wherein the threaded tube has a cavity for receiving the thread of the leg member so that the rod can rotate without the leg member moving.

7. A fastener in accordance with claim 1, wherein the head of the rod has a tool engagement feature for rotating the rod.

8. A fastener in accordance with claim 1, wherein the external face of the anti-rotation body is angled so that it is suitable for fitting into a counter-sunk hole in the surface of a component being clamped.

9. The fastener in accordance with claim 1, wherein the rod member and threaded tube do not move relative to one another due to head end of the shaft being rigidly joined to the threaded tube.

10. The fastener in accordance with claim 1, wherein the rod member shaft has no threads thereon.

11. The fastener in accordance with claim 1, wherein the permanent joining between the head end of the shaft and the threaded tube at one end of the threaded tube is done using a technique selected from the group consisting of brazing, gluing, and shrink-fit.

12. A fastener in accordance with claim 1, wherein the legs have protrusions on the external surface.

13. A fastener in accordance with claim 12, wherein the protrusions include a clamping face parallel to surface of the components to be clamped when the legs are biased outwards.

14. A fastener in accordance with claim 1, wherein the anti-rotation body is a tubular housing having an open end and a closed end, wherein the aperture is located in the closed end.

15. A fastener in accordance with claim 14, wherein the tubular housing has flat faces for accepting an anti-rotation tool.

16. A fastener in accordance with claim 14, wherein bearings are provided between the threaded tube and the interior of the tubular housing.

17. A fastener in accordance with claim 14, wherein the open end has capturing means for holding the threaded tube captive.

18. A fastener in accordance with claim 17, wherein the capturing means is a removable circlip.

19. A method of temporarily co-joining first and second components using a removable blind fastener according to claim 1, wherein the components have apertures, the method comprising the steps of:
   a) aligning the apertures of the first and second components;
   b) inserting a fastener through the aligned apertures;
   c) engaging a rotating tool with the head of the rod and a holding tool with the anti-rotation body; and
   d) operating the rotating tool to rotate the rod to cause telescoping movement of the leg member within the thread tube to bring the free end of the rod into engagement with the tapered bore of the leg member to cause the legs to splay outwards.

* * * * *